Patented Dec. 23, 1952

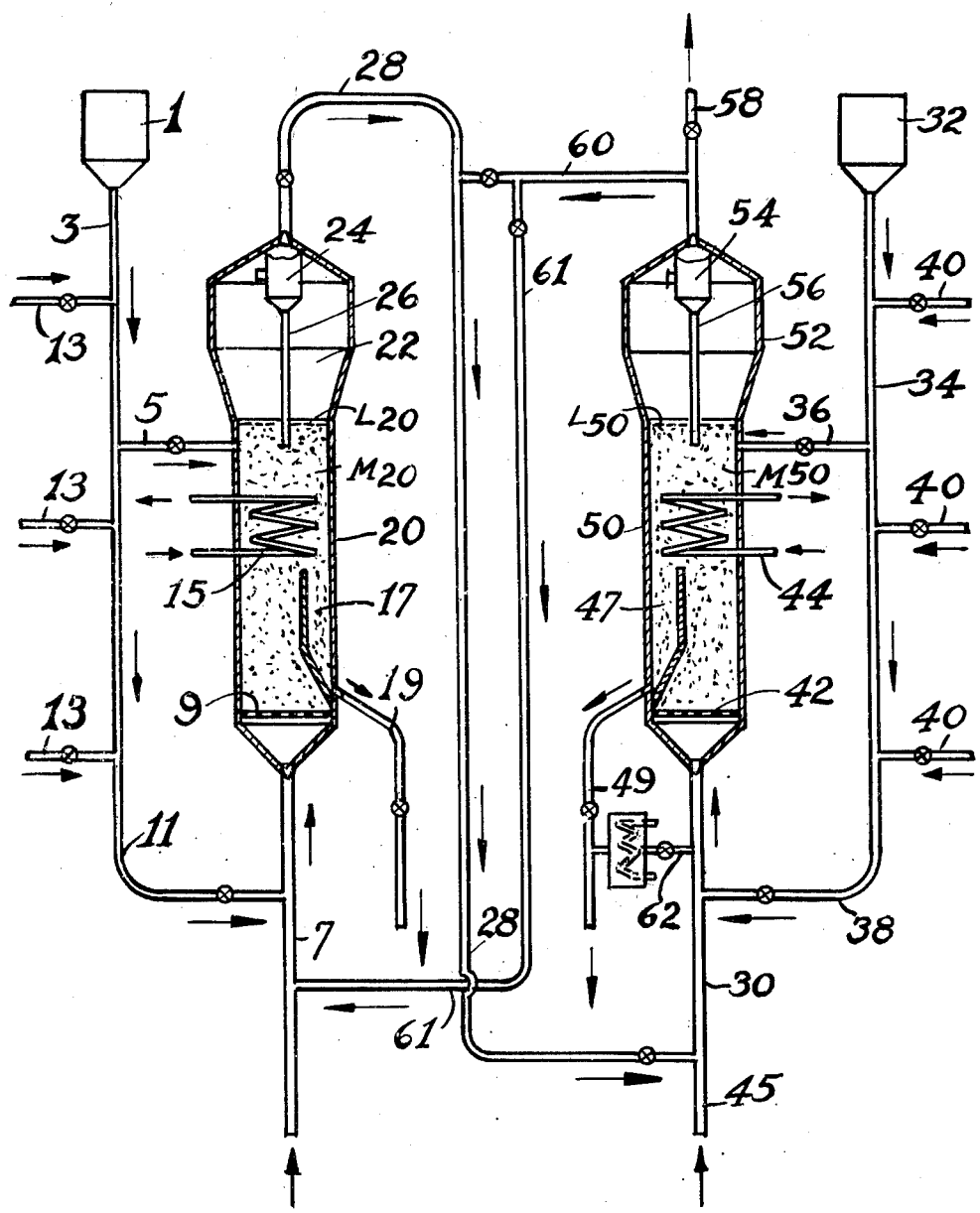

2,623,058

UNITED STATES PATENT OFFICE 2,623,058

PROCESS FOR THE SYNTHESIS OF HYDRO-CARBONS FROM CARBON MONOXIDE AND HYDROGEN

William J. Mattox, Baton Rouge, La., assignor to Standard Oil Development Company, a corporation of Delaware Application October 1, 1947, Serial No. 777,329

6 Claims. (Cl. 260—449.6)

The present invention relates to catalytic conversions and improved catalysts therefor. More particularly, the invention is concerned with improved catalysts for the catalytic hydrogenation of carbonaceous materials and it finds its most useful application in the catalytic synthesis of normally liquid hydrocarbons and oxygenated compounds from CO and $H_2$.

The catalysts most commonly used in the hydrogenation of carbonaceous materials such as hydrocarbons or carbon monoxide are the metals of groups VI and VIII of the periodic system and their oxides and sulfides. The former group of catalysts is more active in the hydrogenation of various types of hydrocarbonaceous materials while the latter group is preferred in the synthesis of valuable products from carbon monoxide and hydrogen. The choice of the proper catalyst and the conditions at which it is applied depend mainly on the type of product desired.

For example, in the conversion of carbon monoxide with hydrogen, nickel catalysts may be used over a wide range of temperatures and pressures to produce predominantly normally gaseous hydrocarbons useful as fuel gases of high heating value and as starting materials for further synthetic processes such as polymerization, alkylation, oxidation, etc. Cobalt type catalysts when employed at relatively low temperatures of about 380°–450° F. and low pressures of about 1–10 atmospheres abs. yield predominantly saturated hdyrocarbons useful as diesel oils, lubricants, paraffin wax, etc. For the synthesis of high grade motor fuels, on the other hand, iron type catalysts are more suitable particularly when used at relatively high temperatures of about 450°–800° F. and pressures of about 3–100 atmospheres abs. or higher, because a predominantly unsaturated product of high octane rating is formed at these conditions.

Catalytic hydrogenation reactions in general and particularly the synthesis of hydrocarbons from CO and $H_2$ are extremely temperature sensitive and subject to relatively rapid catalyst deactivation mainly resulting from the deposition on the catalyst of involatile carbonaceous deposits such as wax, coke, or the like. This situation has led, in recent years, to various attempts and proposals to employ the so-called fluid catalyst technique wherein the gasiform reactants are contacted with a dense turbulent bed of finely divided catalyst fluidized by the gasiform reactants and products. The fluid technique permits catalyst replacement without interruption of the process and greatly improved temperature control and thus constitutes a suitable means for solving the aforementioned problems. However, the adaptation of hydrogenation reactions and particularly of the hydrocarbon synthesis to the fluid catalyst technique has encountered serious difficulties, particularly when iron catalysts are used.

Application of the fluid technique requires in addition to the conventional characteristics determining catalyst activity, such as total desired yield and active catalyst life, ease of fluidization and attrition resistance. It is also desirable, for example, when iron-type synthesis catalysts are used that the catalyst be active in the temperature range above 600° F. and still be largely selective to $C_4+$ hydrocarbons, since under these conditions high octane motor fuels are obtained. None of the prior art catalysts complies satisfactorily with all of these requirements.

Synthesis catalysts are usually prepared by the reduction of various natural or synthetic metal oxides or by the decomposition of metal carbonyls, the catalytic activity being enhanced by the addition of such promoters as various compounds of alkali metals or the oxides of chromium, zinc, aluminum, magnesium, manganese, the rare earth metals and others in small amount of about 1–10%. While some of these catalysts exhibit excellent activity characteristics they are without exception deficient with respect to ease of fluidization, and/or attrition resistance particularly when used in commercial runs of several hundred hours duration. Even fluidized catalysts obtained from sintered iron, which have been found to exhibit excellent fluidization and attrition characteristics show signs of disintegration in long run operation.

This general lack of mechanical resistance or steady decrease of mechanical strength during operation is particularly characteristic for iron type catalysts. It has been found to be closely connected to a high rate of carbon deposition on the catalyst, encountered at the conditions required by the synthesis using iron catalysts. The catalyst disintegration which accompanies excessive carbon deposition is believed to be the result of a migration of carbon into the iron lattice by the mechanism of interstitial carbide formation followed by decomposition of the carbide to free carbon. This process may continue until the catalyst mass contains about 99% of carbon.

It will be appreciated from the above that catalysts of satisfactory activity, selectivity to useful products, and catalyst life which may be used in commercial operation without substantial catalyst disintegration and carbon deposition is a need strongly felt particularly in the synthesis art. This drawback, for example, has been the major obstacle in all attempts to apply the fluid catalyst technique to the iron-catalyzed hydrocarbon synthesis. The present invention overcomes this obstacle and affords various other advantages.

It is, therefore, the principal object of the present invention to provide improved catalysts for the hydrogenation of carbonaceous materials and more particularly for the catalytic conversion of CO with $H_2$.

A further object of the invention is to provide improved hydrogenation processes and more particularly an improved hydrocarbon synthesis process, employing fluidized catalysts, which are not subject to excessive disintegration and carbon formation.

A more specific object of the invention is to provide improved iron catalysts of highest disintegration resistance when used in the synthesis of hydrocarbons from CO and $H_2$ employing the fluid catalyst technique.

Other and further objects and advantages of the invention will appear hereinafter.

In accordance with the present invention hydrogenation and synthesis catalysts of highest mechanical strength and disintegration resistance and lowest carbon forming tendencies are obtained by reacting a catalytically active metal, particularly of Groups VI and VIII of the Periodic System with carbon monoxide to form a volatile carbonyl compound and decomposing the carbonyl compound on an essentially inactive, readily fluidizable carrier material of high attrition and disintegration resistance. Materials suitable for the formation of the carbonyl compounds include a wide variety of metal-containing substances or compositions reducible to the metallic state such as oxides, carbonates, hydroxides, etc. Pure forms of the metals are not required since the volatilization of the carbonyl compound effects the separation of the desired constituents. For example, in the formation of iron carbonyl various types of powdered iron, reduced iron oxides, or a number of reduced iron ores are suitable.

The carrier material may be selected from a large group of substances containing silica, alumina and/or magnesia in various combinations. Specific examples, are silica-alumina and silica-magnesia composites of varying composition, bauxite, fuller's earth, various clays, natural or artificial spinels such as compounds of alumina with zinc oxide, copper oxide, etc. These materials may be subjected to various heat treatments, particularly calcination, preceding their use as carrier materials and the calcination may be so controlled as to effect mild dehydration or to result in partial or substantially complete sintering or fusion. Various powdered metals or alloys may also be used as carrier materials. Materials containing Zn, Cu, Cr, Mo, W, Fe, etc., are especially useful.

The carbonyl compounds are formed by contacting the subdivided metal or metal-containing starting material with CO or a gas rich in CO under a suitable pressure at a temperature sufficiently high to promote the desired reaction but below the decomposition temperature of the carbonyl compound. For purposes of illustration the table below shows the atmospheric pressure decomposition temperatures of the most important metal carbonyls here involved as well as the temperature and pressure ranges preferred for their preparation.

| Carbonyl | Temp. at which carbonyl begins to decompose, °F. (Atm. Press.) | Preferred Operating Conditions | |
|---|---|---|---|
| | | Temp., °F. | Press., lb./sq. in. |
| $Ni(CO)_4$ | 140 | 50–250 | 100–600 |
| $Fe(CO)_5$ | 302 | 50–450 | 100–600 |
| $Cr(CO)_6$ | 266 | 50–350 | 100–600 |
| $Mo(CO)_6$ | 302 | 50–400 | 100–600 |
| $W(CO)_6$ | 302 | 50–400 | 100–600 |
| $[Co(CO)_4]_2$ | 127 | 50–225 | 100–600 |

The carbonyl vapors formed are then contacted with the subdivided carrier material at atmospheric to about 600 lbs./sq. in. pressure and at a temperature at which the carbonyl is rapidly decomposed, usually within the range of about 250° to 750° F. depending on the metal carbonyl used, so as to deposit the metal on the carrier material in the desired proportions. The decomposition of the carbonyl may take place in the hydrogenation or synthesis reactor itself. Particularly in this case it is not necessary that all of the carbonyl metal be deposited on the surface of the carrier material, good operation being obtained in this manner with mechanical mixtures of carbonyl metal and carrier material. If a promoter is required in the final catalyst it may be incorporated into the carrier material by suitable impregnation or mixing prior to the deposition of the carbonyl metal or it may be added continuously or intermittently as required by means of suitable solutions or as molten salts.

The relative proportions of the constituents of the catalysts of the present invention may vary within wide limits. It has been found, however, that catalysts of excellent activity, selectivity, carbonization, mechanical strength and fluidization characteristics may be obtained by combining as little as 1%, or less, by weight of carbonyl metal in the supports of the invention, particularly the synthetic spinels listed above. The metal concentration may therefore be advantageously held within the most economical limits of preferably about 1–10% without detrimentally affecting the catalytic performance of the catalyst. However, higher metal concentrations of, say, up to about 50% or higher, may be used if desired. The amounts of promoter added may vary between about 0.5 and 10%, preferably about 1–5%, depending on the character of the promoter.

The preparation of the metal carbonyl and its decomposition on the carrier material may be carried out by passing the respective gasiform materials over the solids arranged as fixed beds in suitable reaction zones. However, in accordance with the preferred embodiment of the invention the fluid solids technique is employed at least for the formation of the metal carbonyl and preferably also for its decomposition on the carrier material.

For this purpose, the metal-containing starting material having a particle size of about 5–200 microns, preferably about 75–90% of 20–100 micron material is maintained in a reaction zone in the form of a dense turbulent mass of solids fluidized by the upwardly flowing CO-containing gas to assume an apparent density of about 30–150 lbs. per cu. ft. and a well defined upper level at the reaction conditions specified above. Superficial linear gas velocities of about 0.5–5 ft. per second are generally suitable mainly depending on the specific gravity and particle size of the solids used. This production of the metal carbonyl may be conducted in a fully continuous manner by supplying fresh metal-containing solids and withdrawing spent solids to and from the fluidized bed as a function of the rate of metal conversion.

The metal carbonyl vapors formed in the first stage of the process may then be contacted with a dense turbulent carrier mass fluidized in a manner substantially analogous to that just described. The particle sizes of the carrier material may be generally somewhat larger than that specified for the metal-containing starting material and may fall within the approximate range of 50–500 microns. If desired, the carbonyl vapors may be diluted with a non-oxidizing gas such as nitrogen or hydrogen to improve fluidization.

Having set forth its objects and general nature the invention will be best understood from the more detailed description hereafter, wherein reference will be made to the accompanying drawing which illustrates schematically a system suitable for the production of catalysts in accordance with the present invention.

Referring now to the drawing, the system illustrated therein consists essentially of two conventional fluid reactors 20 and 50 whose functions and cooperation will be forthwith explained using the preparation of an iron type catalyst for the synthesis of hydrocarbons from CO and $H_2$ as an example. It will be understood, however, that other catalysts of the type here involved may be prepared in a substantially analogous manner.

In operation, feed hopper 1 contains a finely divided mass of an iron-containing material such as reduced iron ore, or metallic iron having a particle size of about 20–100 microns. The iron material may flow by gravity from hopper 1 through lines 3 and 5 into reactor 20. Simultaneously, CO or a gas rich in CO such as producer gas, water gas, synthesis feed gas or the like is supplied through line 7 to the bottom of reactor 20 which it enters through distributing means such as a perforated grid 9. If desired, the iron-containing material may be passed through lines 3 and 11 to gas feed line 7 to form a dilute solids-in-gas suspension therein which enters reactor 20 through grid 9 in a manner known per se in the art of fluid solids handling. Particularly in the latter case, line 3 may have the form of a conventional standpipe aerated through taps 13 and high enough to create the pseudo-hydrostatic pressure required to force the suspension in line 7 into reactor 20 against the combined gas and pseudo-hydrostatic pressures of the reactor. The feed rate of gases and solids and the superficial gas velocity within reactor 20 are so controlled that a dense turbulent fluidized mass ($M_{20}$) is formed having a density of about 40–100 lbs. per cu. ft. and a well defined upper level ($L_{20}$). Gas velocities of about 0.5–1.5 ft. per second are suitable for this purpose at the particle sizes indicated.

Reactor 20 is provided with conventional temperature control means such as a heat transfer coil 15 which may be supplied with a suitable heat transfer medium such as Dowtherm, steam or the like to maintain mass ($M_{20}$) at the desired reaction temperature of about 50° to 450° F. The pressure within reactor 20 is preferably kept at about 100 to 600 lbs. per sq. in. for the purposes of the present example. At these conditions, CO reacts rapidly with the iron to form iron carbonyl. Spent solids may be withdrawn downwardly from mass ($M_{20}$) through a withdrawal well 17 and pipe 19, normally at about the same rate at which fresh solids are supplied through lines 5 and/or 11. However, the rates of solids supply and withdrawal may be varied to change the bed level ($L_{20}$) and with it the solids hold-up and contact time within reactor 20. Quite generally the dimensions and operating conditions of reactor 20 are so chosen that a slight excess of metal carbonyl is formed over that necessary to meet the metal requirements in the decomposition stage as carried out in vessel 50. Unconverted iron withdrawn through line 19 may be returned to hopper 1 to be re-treated in reactor 20.

The CO-concentration of the gases introduced through line 7 is preferably so chosen that the CO is substantially completely consumed on its path through reactor 20. In this manner the free CO-content of the vapors discharging from reactor 20 is at a minimum which aids the subsequent decomposition reaction of the iron-carbonyl in reactor 50. If required for proper fluidization, the gas in line 7 may be diluted with inert gases such as $CO_2$, $N_2$, $H_2$, etc. In operations employing reactor 50 as the synthesis vessel, it is not necessary to effect high CO conversions in reactor 20. In this type of operation unreacted CO may be either recycled or blended with the feed gas to the synthesis reaction.

The iron carbonyl vapors formed in mass ($M_{20}$) are withdrawn overhead from level ($L_{20}$) and enter an enlarged disengaging space 22 wherein most of the entrained solids settle out as a result of the reduced gas velocity. Solids fines which remain suspended may be separated from the vapors in a conventional gas-solids separating system 24 which may comprise filters, cyclones, precipitators, etc. Solids separated in system 24 may be returned through line 26 to mass ($M_{20}$). The carbonyl vapors leave through line 28 and are passed through line 30 to reactor 50 to be treated therein as will be forthwith described.

A finely divided substantially inactive carrier such as a zinc-alumina spinel, a silica-alumina composite containing about 88% of $Al_2O_3$ and 12% $SiO_2$, or 50% $SiO_2$ and 3% $Al_2O_3$, or a silica-magnesia composite containing about 88% MgO and 12% $SiO_2$, or similar composites, which may be impregnated with about 0.5–10%, preferably about 1–5% of a promoter such as a halide, oxide, or carbonate of potassium or sodium and which may have a particle size of about 100–200 microns is supplied from hopper 32 through standpipe 34 and lines 36 and/or 38 to reactor 50 substantially as outlined in connection with reactor 20. Standpipe 34 is provided with aeration taps 40.

The iron carbonyl vapors supplied from line 28 substantially at the temperature of reactor 20 enter reactor 50 through line 30 and grid 42, if desired together with finely divided carrier material fed through line 38. The fluidization conditions within reactor 20 are substantially the same as those outlined in connection with reactor 20 except that the bed density of mass ($M_{50}$) having level ($L_{50}$) may be somewhat lower, that is about 20–60 lbs. per cu. ft. at the particle sizes and gas velocities specified. If desired a non-oxidizing gas such as $H_2$, $N_2$, etc. may be added in any suitable proportion through line 45 to aid in the fluidization of mass ($M_{50}$).

Reactor 50 is provided with suitable heating means such as a coil 44 containing a heating fluid such as Dowtherm, superheated steam, etc. so as to heat the fluidized mass in reactor 50 above the decomposition temperature of iron carbonyl, preferably to a temperature of about 600°–700° F. As a result of the excellent heat transfer and the perfect gas-solids distribution within the fluidized solids mass the carbonyl iron formed is uniformly distributed throughout mass ($M_{50}$) to form a substantially uniform film of iron on the surface of the carrier particles. The thickness of this film may be readily controlled within the ranges of metal content specified above by a proper choice of the iron carbonyl concentration of the gas entering through line 30 and/or the contact time between gas and solids and/or the throughput of the gas-vapor mixture.

Excess gases and unconverted iron-carbonyl vapors are withdrawn overhead from level ($L_{50}$) into disengaging zone 52 and gas-solids separator 54 from which separated solids may be returned through pipe 56. Gases and vapors now substantially free of solids may be either vented through line 58 or recycled through lines 60 and 28 to gas feed line 30 or through lines 60 and 61 to gas feed line 7 of reactor 20 to effect reduction and/or formation of carbonyls in reactor 20. Finished catalyst of the desired composition may be withdrawn through withdrawal well 47 and pipe 49 to be passed to storage or directly to a separate synthesis reactor (not shown) at a rate adequate to control the desired holdup and contact time in reactor 50 as outlined in connection with reactor 20.

In accordance with a preferred embodiment of the invention, reactor 50 may be the synthesis reactor itself operated at a synthesis temperature of about 600°–750° F. and a pressure of about 200–400 lbs. per sq. in. In this case a synthesis gas containing $H_2$ and CO in the ratio of about 1–2:1 is supplied through line 45. Reactor 50 may be supplied from hopper 32 with an amount of carrier material sufficient to establish the desired holdup in reactor 50. No substantial further addition of carrier material is required. The iron-carbonyl vapors may be supplied continuously or intermittently through line 28 either alternately or together with the synthesis gas in proportions adequate to maintain the desired iron concentration on the catalyst. Although there is a continuous addition of metal as carbonyl, the desired proportion may be substantially maintained by a corresponding loss of iron-rich fines through separator 54. Any loss of carrier material may be made up by a controlled supply from hopper 32. Instead of feeding the carbonyl vapors directly to reactor 50 they may be absorbed in a cooled recycle stream 62 of the fluidized material withdrawn from reactor 50, before its return to the reactor. In this manner a more uniform distribution of the highly active metal is accomplished. The iron-rich fines lost through separator 54 may be recovered by any suitable means, such as oil scrubbing, and returned to hopper 1 for reuse.

When reactor 50 is used as the synthesis reactor the following operating conditions may be employed to give yields of $C_4+$ hydrocarbons amounting to about 180–190 cc./$m^3$ $H_2$+CO consumed: pressure, 400 lbs.; temperature, 650° F.; $H_2$/CO ratio, 2/1; recycle ratio, 2–3/1; and a fresh feed rate corresponding to about 75–100 cu. ft./hr. of $H_2$+CO/lb. of iron.

It will be understood by those skilled in the art that standpipes 3 and 34 may be replaced by any suitable means for conveying finely divided solids such as screw conveyors, lock hoppers, etc.

The invention will be further illustrated by the following example demonstrating the utility of the catalysts of the invention in the hydrocarbon synthesis.

*Example*

A catalyst containing 46% carbonyl iron, 50% $SiO_2$, 3% $Al_2O_3$ and 1% $K_2O$ was prepared substantially as described above. This material was tested in a fixed bed laboratory unit at the conditions and with the results listed below.

Temperature, °F _____ 600
Pressure, p. s. i. g _____ 250
$H_2$/CO, feed _____ 1.17/1
V/v/hr. _____ 200
Run hours _____ 141–164
Material balance, wt.% _____ 89
CO conv.:
   % input _____ 84
   % output _____ 82
cc. Oil/$m^3$ $H_2$+CO cons _____ 145
Distr. ratio, $C_4+/C_1+$ _____ 0.50
cc. $C_3+/m^3$ $H_2$+CO cons _____ 215

The above data show that active and selective catalysts may be made by preparing and decomposing iron carbonyl on fluidizable substantially inactive bases in accordance with the invention. Carbon formation is only a fraction of that of conventional iron catalysts of comparable activity and selectivity, indicating a superior resistance to disintegration. The catalyst of the invention thus combines high activity and liquid product selectivity with low carbon forming tendencies and high resistance to attrition and disintegration, which makes it ideally suitable for fluid operation. An additional advantage resides in the fact that this improved performance may be accomplished with an iron concentration on the catalyst as low as about 1% by weight which may be readily maintained constant by continuous or intermittent reactivations with decomposing iron carbonyl.

While the above data were obtained in fixed bed operation it is noted that the catalysts of the invention compare just as favorably with conventional catalysts in fluid operation, even though the higher gas throughputs, high recycle ratios, and high catalyst turbulence typical for fluid operation quite generally cause a slight decrease in conversion and liquid product yields and an appreciable increase in carbon formation and catalyst disintegration for all types of iron catalysts alike. It follows that the catalysts of the present invention, as the result of the combination of the characteristics demonstrated above, are particularly useful for fluid operation when prepared in fluidizable particle sizes substantially as outlined above. The conditions of fluid synthesis operation are well known in the art and need not be further specified here for a proper understanding of the invention by those skilled in the art.

The present invention is not to be limited by any theory of the mechanism of the process or catalyst nor to any examples given merely for illustration purposes, but only by the following claims in which I wish to claim all novelty inherent in the invention:

I claim:

1. An improved process for the catalytic synthesis of normally liquid hydrocarbons from CO and $H_2$ which comprises contacting a synthesis gas mixture containing CO and $H_2$ with a dense, turbulent, fluidized mass of finely divided solids containing an iron group metal having synthesizing activity in a first reaction zone at conditions of temperature and pressure suitable for the formation of a vaporous carbonyl compound of said meal, downwardly withdrawing and recovering spent solids from said mass, withdrawing a mixture of metal carbonyl vapors and residual synthesis gas upwardly from said mass, contacting said mixture with a second dense, turbulent, fluidized mass of a substantially inactive carrier material having a fluidizable particle size and a high disintegration resistance maintained in a second reaction zone at synthesis conditions of temperature and pressure conducive to the decomposition of said carbonyl compound into CO and said metal and the deposition of said metal on said carrier, withdrawing a stream of carrier material downwardly from said second mass, withdrawing vaporous synthetic products upwardly from said second mass, cooling at least a portion of said withdrawn stream of carrier material, contacting said withdrawn mixture of metal carbonyl vapors and residual synthesis gas prior to its entry into said second reaction zone with said cooled stream of carrier material to form a solids-in-gas suspension and to absorb said metal carbonyl vapors uniformly in said cooled stream and supplying said suspension to said second reaction zone.

2. The process of claim 1 in which additional synthesis gas is supplied to said second reaction zone.

3. The process of claim 1 in which said metal is iron, and said synthesis conditions comprise temperatures of about 600°–750° F., and pressures of about 200–400 lbs. per sq. in.

4. The process of claim 3 in which said carrier material comprises a major proportion of silica and is impregnated with a minor proportion of a promoter increasing the selectivity of the carrier-iron composite formed, toward normally liquid products.

5. The method of claim 1 in which exit gas from said second reaction zone is returned to said first reaction zone.

6. The method of claim 1 in which fines of metal-carrying carrier material issuing from said second reaction zone are returned to said first reaction zone.

WILLIAM J. MATTOX.

REFERENCES CITED

The following references are of record in the file of this patent:

UNITED STATES PATENTS

| Number | Name | Date |
|---|---|---|
| 2,242,115 | Dancigor | May 13, 1941 |
| 2,250,421 | Riblett | July 22, 1941 |
| 2,409,235 | Atwell | Oct. 15, 1946 |
| 2,417,164 | Huber, Jr. | Mar. 11, 1947 |
| 2,451,879 | Scharmann | Oct. 19, 1948 |